United States Patent
Pohl et al.

(10) Patent No.: US 9,944,535 B2
(45) Date of Patent: Apr. 17, 2018

(54) PRECIPITATED CALCIUM CARBONATE FROM PULP MILL WASTE HAVING AN IMPROVED BRIGHTNESS, METHOD FOR THE PRODUCTION AND USE THEREOF

(71) Applicant: Omya International AG, Oftringen (CH)

(72) Inventors: Michael Pohl, Villach (AT); Thomas Schmölzer, Landskron (AT)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/133,492

(22) Filed: Apr. 20, 2016

(65) Prior Publication Data
US 2016/0229702 A1   Aug. 11, 2016

Related U.S. Application Data

(62) Division of application No. 14/113,888, filed as application No. PCT/EP2012/058432 on May 8, 2012, now Pat. No. 9,409,788.

(60) Provisional application No. 61/490,128, filed on May 26, 2011.

(30) Foreign Application Priority Data

May 16, 2011   (EP) .................................... 11166216

(51) Int. Cl.
| | | |
|---|---|---|
| C01F 11/18 | (2006.01) | |
| B82Y 30/00 | (2011.01) | |
| C01F 5/24 | (2006.01) | |
| C09C 1/02 | (2006.01) | |
| C01B 32/60 | (2017.01) | |
| C08K 3/26 | (2006.01) | |

(52) U.S. Cl.
CPC ............ *C01F 11/185* (2013.01); *B82Y 30/00* (2013.01); *C01B 32/60* (2017.08); *C01F 5/24* (2013.01); *C01F 11/18* (2013.01); *C01F 11/181* (2013.01); *C09C 1/021* (2013.01); *C09D 7/61* (2018.01); *C09D 7/67* (2018.01); *C09D 7/68* (2018.01); *C01P 2004/03* (2013.01); *C01P 2004/52* (2013.01); *C01P 2004/61* (2013.01); *C01P 2004/62* (2013.01); *C01P 2004/64* (2013.01); *C01P 2004/84* (2013.01); *C01P 2006/12* (2013.01); *C01P 2006/22* (2013.01); *C01P 2006/60* (2013.01); *C08K 2003/265* (2013.01)

(58) Field of Classification Search
CPC ........................... C01F 11/185; C01P 2000/84
See application file for complete search history.

(56) References Cited

U.S. PATENT DOCUMENTS

| | | | |
|---|---|---|---|
| 4,900,533 A | 2/1990 | Malden | |
| 5,292,365 A | 3/1994 | Delfosse | |
| 5,792,440 A | 8/1998 | Huege | |
| 5,833,747 A | 11/1998 | Bleakley et al. | |
| 5,861,209 A | 6/1999 | Haskins et al. | |
| 6,592,837 B2 | 7/2003 | Denholm et al. | |
| 8,002,887 B2 * | 8/2011 | Rainer ..................... | C01F 11/18 |
| | | | 106/464 |
| 8,551,428 B2 * | 10/2013 | Pohl ......................... | C01F 5/24 |
| | | | 423/165 |
| 9,017,631 B2 * | 4/2015 | Gane ..................... | C01F 11/183 |
| | | | 423/432 |
| 2005/0027689 A1 | 2/2005 | Bogdanov | |

(Continued)

FOREIGN PATENT DOCUMENTS

| | | |
|---|---|---|
| CN | 101326123 A | 12/2008 |
| EP | 0604095 A1 | 6/1994 |

(Continued)

OTHER PUBLICATIONS

Office Action for Chinese Application No. 201280023400.3.
Office Action for Colombian Application No. 13-269509-4.
European Search Report dated Nov. 11, 2009 for European Application No. 11166216.9.
Office Action dated Dec. 19, 2013 for European Application No. 11166216.9.
Office Action dated Jan. 27, 2015 for Japanese Application No. 2014-510729.
Office Action dated Mar. 12, 2015 for Korean Application No. 9-5-2015-017000055.
Office Action for Russian Application No. 2013155614.
Ogunniyi et al. "Calcium carbonates as fillers in rubbers." Plastics and Rubber International, Dec. 1989, vol. No. 6, pp. 22-25.

(Continued)

*Primary Examiner* — Stuart Hendrickson
(74) *Attorney, Agent, or Firm* — Amster, Rothstein & Ebenstein LLP

(57) ABSTRACT

The present invention relates to a process for the production of a precipitated divalent metal ion carbonate product from a divalent metal ion carbonate which was recovered from waste, the precipitated divalent metal ion carbonate product having an improved brightness, the process comprising the steps of: providing a low-purity divalent metal ion carbonate material, the divalent metal ion carbonate material being recovered from waste; calcining the divalent metal ion carbonate material in order to obtain a divalent metal ion oxide; slaking the divalent metal ion oxide in order to obtain an aqueous suspension of a divalent metal ion hydroxide; carbonating the aqueous suspension of the divalent metal ion hydroxide with a carbon dioxide containing compound in order to obtain fine precipitated divalent metal ion carbonate particles; post-treating the fine precipitated divalent metal ion carbonate particles to obtain fine discrete precipitated divalent metal ion carbonate particles; adding the fine discrete precipitated divalent metal ion carbonate particles to an aqueous suspension of divalent metal ion hydroxide that was obtained by slaking high-purity divalent metal ion hydroxide in order to obtain a resulting reaction mixture; and carbonating the resulting reaction mixture in order to obtain the precipitated divalent metal ion carbonate product having an improved brightness.

22 Claims, 4 Drawing Sheets

(56) References Cited

U.S. PATENT DOCUMENTS

2005/0276897 A1    12/2005   Nover et al.
2010/0000444 A1     1/2010   Constantz et al.

FOREIGN PATENT DOCUMENTS

| | | |
|---|---|---|
| EP | 1052227 A2 | 11/2000 |
| EP | 1790616 A1 | 5/2007 |
| EP | 2070578 A1 | 6/2009 |
| EP | 2447213 A1 | 5/2012 |
| ES | 2175072 T3 | 11/2002 |
| GB | 2145074 A | 3/1985 |
| JP | 200669860 A | 3/2006 |
| WO | 9628517 A1 | 9/1996 |
| WO | 9632354 A1 | 10/1996 |
| WO | 9711030 A1 | 3/1997 |
| WO | 9813298 A1 | 4/1998 |
| WO | 2007068593 A1 | 6/2007 |
| WO | 2008013180 A1 | 1/2008 |
| WO | 2011054831 A1 | 5/2011 |

OTHER PUBLICATIONS

English translation of Examination Report dated Aug. 4, 2015 for TW 101116153.
International Search Report dated Jun. 22, 2012 for PCT Application No. PCT/EP2012/058432.
Written Opinion of the International Searching Authority dated Jun. 22, 2012 for PCT Application No. PCT/EP2012/058432.

* cited by examiner

PRECIPITATED CALCIUM CARBONATE FROM PULP MILL WASTE HAVING AN IMPROVED BRIGHTNESS, METHOD FOR THE PRODUCTION AND USE THEREOF

CROSS-REFERENCE TO RELATED APPLICATIONS

This is a divisional of U.S. application Ser. No. 14/113,888, filed Dec. 13, 2013, which is a U.S. National Phase of PCT Application No. PCT/EP2012/058432, filed May 8, 2012, which claims priority to European Application No. EP 11166216.9, filed May 16, 2011 and U.S. Provisional Application No. 61/490,128, filed May 26, 2011, the contents of which are hereby incorporated herein by reference in their entirety.

TECHNICAL FIELD OF THE INVENTION

The present invention relates to a process for the production of precipitated calcium carbonate (PCC) from waste lime, the mineral pigments of the precipitated calcium carbonate species (PCC) obtained by this process and the use of these mineral pigments.

BACKGROUND OF THE INVENTION

Calcium carbonate is used extensively in the paper industry as a filler component in paper. It is a low cost, high brightness filler used to increase sheet brightness and opacity. Its use has increased dramatically in the last decades due to the conversion from acid to alkaline papermaking at paper mills. Both natural and synthetic calcium carbonates are used in the paper industry. Natural carbonate, such as limestone, marble or chalk is ground to a small particle size prior to its use in paper, while synthetic calcium carbonate is manufactured by a precipitation reaction and is therefore called precipitated calcium carbonate (PCC).

Usually, PCC is prepared by introducing $CO_2$ into an aqueous suspension of calcium hydroxide, the so-called milk of lime $$Ca(OH)_2 + CO_2 \rightarrow CaCO_3 + H_2O.$$

This process has demonstrated the capability to produce PCC with superior opacifying characteristics, PCC is typically superior in opacifying and brightening the sheet, as compared to ground calcium carbonate (so-called GCC). Scalenohedral-shaped precipitated calcium carbonate with a rosette-like aggregate structure has been found to impart high sheet opacity. The carbonation process has also shown flexibility in producing various particle shapes and sizes for various applications as both a paper filler and in paper coatings.

Besides its use in the papermaking industry, precipitated calcium carbonate is also used for various other purposes, e.g. as filler or pigment in the paint industries, and as functional filler for the manufacture of plastic materials, plastisols, sealing compounds, printing inks, rubber, toothpaste, cosmetics, etc.

Technical Problems

Nowadays, with an ecological concept one is focused on recovering unused material derived from a process or recovering used material from products or processes and on reusing the recovered materials.

For example, in the chemicals recovery system in kraft pulp mills large quantities of calcium carbonate with low chemical purity are discharged as solid waste materials, and therefore, would be easily available as an inexpensive raw material source for the manufacturing of calcium carbonate fillers and/or coating pigments.

Due to a coarse particle size, the presence of discoloring impurities and the low brightness of this "pulp mill waste calcium carbonate", the usage of such a material is, however, prohibitive or limited to very low amounts, if the brightness of the final calcium carbonate product should be kept on a sufficiently high level and the application performance should reach the level of products that are manufactured from high-quality raw materials such as calcium carbonate fillers or coating pigments made from chalk, limestone or marble.

Hence, a method to increase the brightness of calcium carbonate products containing calcium carbonate recovered from wastes, and in particular from pulp mill waste, and to convert the recovered material into calcium carbonate mineral fillers and/or coating pigments that can be used for typical applications would be highly desirable.

Prior art processes are based on the processing of the calcium carbonate material recovered from the pulp mill waste. For example, Brazilian patent application PI 0903782-9 describes a process where calcium carbonate material recovered form the causticizing process of the cellulose industry is treated with phosphoric acid in order to upgrade and purify said calcium carbonate material.

JP 6073690 A discloses the preparation of a precipitated calcium carbonate having a specific surface area of at least 6 $m^2/g$. Waste carbon dioxide and waste lime produced in paper manufacturing factories can be utilized in the preparation of this PCC. In one example, lime containing trivalent metal oxide impurities was reacted at 50° C. for 1 hour, and the reaction product was passed through a screen to obtain the milk of lime. Then, the milk of lime was subjected to wet crushing and was diluted to prepare milk of lime having a concentration of 8% by weight. Then it was subjected to carbonation and was again passed through a screen in order to obtain the precipitated calcium carbonate.

WO 96/32354 A1 relates to a method for treating solid-containing material contained in or produced from waste paper or an effluent from a plant for treating paper or waste paper, the solid-containing material including organic material and inorganic particulate material. The solid-containing material treated by the method may include calcium carbonate, which is calcined to form calcium oxide, and the calcium oxide being converted to calcium hydroxide when the calcium oxide is formed in an aqueous suspension. The milk of lime is then converted to precipitated calcium carbonate by introducing carbon dioxide. This precipitated calcium carbonate is then used for the preparation of paper coating compositions. Examples of material comprising the precipitated calcium carbonate as well as other minerals, such as kaolin clay, exhibited an ISO brightness of 70.6 or 75.5%.

WO 97/11030 A1 is concerned with a method for manufacturing high purity calcium carbonate by combining a source of impure calcium oxide or calcium hydroxide with water to form an aqueous suspension. The solids within the suspension are allowed to settle so that a clear, saturated solution of calcium hydroxide is formed. This solution is then further reacted with carbon dioxide in order to obtain the high purity precipitated calcium carbonate. However, there is nowhere mentioned in this document that the milk of lime as formed can be used in a further carbonation step, without the need of removing any impurities contained in the milk of lime.

US 2010/0000444 A1 also describes a method for producing a composition comprising carbonates, wherein the method comprises utilizing waste sources of metal oxides, such as calcium oxide or calcium hydroxide. An aqueous solution of divalent cations derived from the waste source of metal oxides is contacted with carbon dioxide and subjected to precipitation conditions in order to provide the compositions comprising carbonates, such as calcium carbonate. The resulting product can be used in building-materials, such as cement. No information is given having regard to the ISO brightness, the specific surface area or the weight median particle diameter of the resulting calcium carbonate.

EP 0 946 417 B1 and EP 0 815 175 B1 also discloses methods for the recovering of calcium from waste material or contaminated natural calcic material, which basically comprise the steps of providing the calcium compound in an acid soluble form such as calcium oxide and calcium carbonate, preparing an aqueous suspension of the calcium compound material and carbonating the aqueous suspension of the calcium compound material in order to obtain precipitated calcium carbonate. The recycled calcium carbonate of EP 0 815 175 B1 was tested for its performance in paper.

The Applicant knows also the EP 0 604 095 B1 and the EP 1 052 227 B1 disclosing methods for the recovering of by-products of an industrial process in view of providing mixed aggregated materials.

Finally, EP 2 070 578 A1 is concerned with the sequestration of carbon dioxide by the reaction with alkaline solid wastes containing accessible calcium oxide and/or calcium hydroxide. Since the focus of this invention was the sequestration of carbon dioxide, this document is silent on the properties of the resulting precipitated calcium carbonate.

Although there exist numerous prior art documents describing the recycling of calcium carbonate, calcium oxide or calcium hydroxide in order to obtain calcium carbonate having a good brightness, there still exists the need for the production of high-quality calcium carbonate with improved brightness that can be used in industries such as papermaking, paint, plastics and others.

In particular, there does not exist any teaching having regard to further processing of the precipitated calcium carbonate obtained in several steps from the waste, and in particular from the pulp mill waste, to produce fine particles that can be used as seeds for the mineral material deposition of high-quality precipitated calcium carbonate onto the low-quality substrate obtained from waste resources.

Object of the Invention

Accordingly, it is an objective of the present invention to provide a new process for the production of a precipitated divalent metal ion carbonate product from a divalent metal ion carbonate which was recovered from waste, the precipitated divalent metal ion carbonate product having a comparable or even an improved brightness, as compared to other precipitated divalent metal ion carbonate products which are obtained from waste resources and are produced by prior art processes.

It is a further object of the present invention to provide the various precipitated divalent metal ion carbonate products obtained by the inventive process.

A yet further object of the present invention is also to provide the use of the various precipitated divalent metal ion carbonate products.

A yet further object of the present invention is also to provide a process to manufacture precipitated divalent metal ion carbonate product from a divalent metal ion carbonate which was recovered from waste that is more economical as compared to processes described in the prior art.

These and additional object and advantages will be more understood in view of the following detailed description.

DETAILED DESCRIPTION OF THE INVENTION

Figure 1:
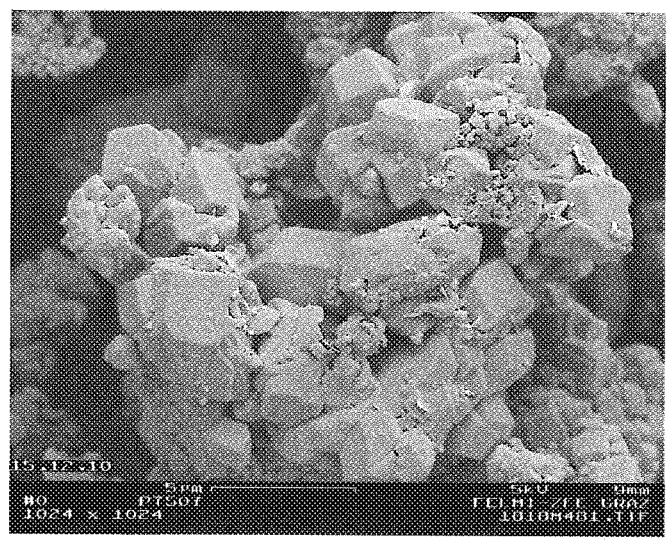
FIG. 1 is a SEM photomicrograph of a waste calcium carbonate as discharged from a kraft pulp mill's chemical recovery process.
Figure 2:
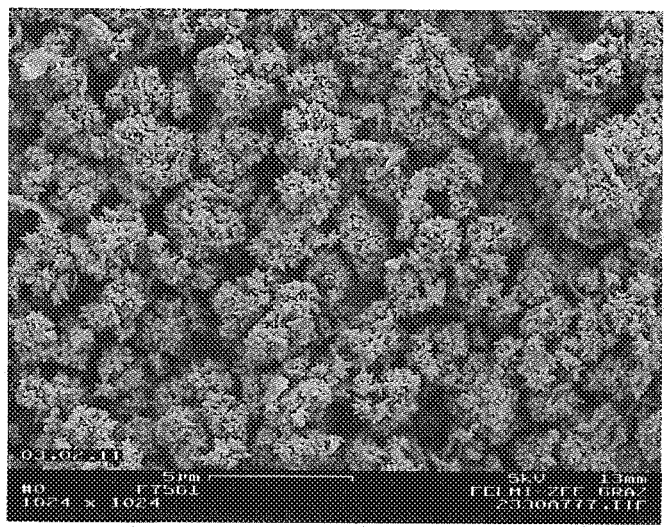
FIG. 2 is a SEM photomicrograph of a scalenohedral-shaped PCC having rosette-like aggregate structure and being made according to the prior art carbonation process described in Example 1.
Figure 3:
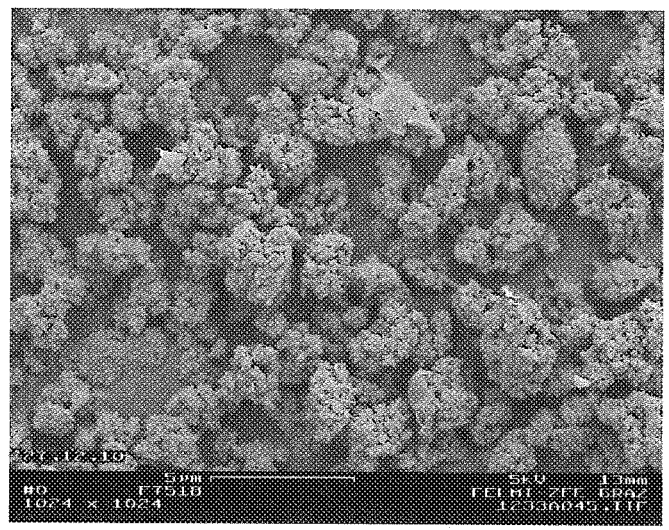
FIG. 3 is a SEM photomicrograph of a scalenohedral-shaped PCC having rosette-like aggregate structure and being made according to this invention by the process described in Example 2.

All parts, percentages and ratios used herein are expressed by weight of dry matter unless otherwise specified. All documents cited herein are incorporated by reference.

The present invention aims at solving the objects outlined above by providing a process for the production of a precipitated divalent metal ion carbonate product from a divalent metal ion carbonate which was recovered from waste, the precipitated divalent metal ion carbonate product having a comparable or even an improved brightness, as compared to other precipitated divalent metal ion carbonate products which are obtained from waste resources and are produced by prior art processes, and as described in the present invention and as defined in the claims.

In view of the foregoing, the inventors of the invention surprisingly found that the brightness of divalent metal ion carbonate mineral fillers and/or coating pigments that were recovered from waste resources, can be substantially improved by process that comprises the steps of:
(a) providing a low-purity divalent metal ion carbonate material, the divalent metal ion carbonate material being recovered from waste;
(b) calcining the divalent metal ion carbonate material of step (a) in order to obtain a divalent metal ion oxide;
(c) slaking the divalent metal ion oxide obtained in step (b) in order to obtain an aqueous suspension of a divalent metal ion hydroxide;
(d) carbonating the aqueous suspension of the divalent metal ion hydroxide obtained in step (c) with a carbon dioxide containing compound in order to obtain fine precipitated divalent metal ion carbonate particles;
(e) post-treating the fine precipitated divalent metal ion carbonate particles obtained in step (d) to obtain fine discrete precipitated divalent metal ion carbonate particles (f) mixing the fine discrete precipitated divalent metal ion carbonate particles obtained in step (e) with an aqueous suspension of divalent metal ion hydroxide that was obtained by slaking high-purity divalent metal ion oxide in order to obtain a resulting reaction mixture; and (g) carbonating the resulting reaction mixture of step (f) in order to obtain the precipitated divalent metal ion carbonate product having an improved brightness as compared to the precipitated divalent metal ion carbonate particles obtained in step (d).

Moreover, the inventors also surprisingly found that by the process according to the present invention the amount of low-purity divalent metal ion carbonate in the final precipitated product can almost be doubled without impairing the good brightness of the resulting final product. It can be said that the brightness of the final product is even improved although it contains almost twice as much low-purity divalent metal ion carbonate than the comparable product known from the prior art.

For the purpose of the present invention, the term "waste" is defined as inorganic materials remaining from a production process or as material being derived from the recycling of a product containing such inorganic materials, such as for example, inorganic material which derived from the recycling of paper. Some components of the waste have economical value and can be recycled once correctly recovered. In the present invention the component having economical value is a divalent metal ion carbonate material, such as for example calcium carbonate, magnesium carbonate, beryllium carbonate, strontium carbonate or barium carbonate material, and in particular calcium carbonate material, either in the natural form, ground (or natural) calcium carbonate (GCC), and/or precipitated calcium carbonate (PCC), which is also known as synthetic calcium carbonate. The waste can be every waste containing an essential amount of the divalent metal ion carbonate material, and especially of the calcium carbonate material, and is, for example, waste derived from a pulp- and/or papermaking industry.

A "slurry" in the meaning of the present invention is a suspension (comprising essentially insoluble solids and water and optionally further additives) and usually has a higher density than the liquid without solids from which it is formed.

A "specific surface area" (SSA) or "BET specific surface area" in the meaning of the present invention relates to the specific surface area measured via the method provided in the examples section hereafter.

"Ground calcium carbonate" (GCC) in the meaning of the present invention is a calcium carbonate obtained from natural sources such as marble, chalk or limestone, and processed through a treatment such as grinding, screening and/or fractionizing under wet and/or dry conditions, for example by a cyclone.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment.

The term "brightness" as used in the context of the present invention is a measurement of the percentage of diffuse light reflected from a paper's surface or a powder tablet produced from a pigment. A brighter sheet or pigment reflects more diffuse light. As used herein, brightness of the paper or pigment may be measured at a wavelength of light of 457 nm (R457) and is specified in percent.

"Low-purity divalent metal ion carbonate material" in the meaning of the present invention is a divalent metal ion carbonate, such as calcium carbonate or magnesium carbonate, having an ISO brightness R457 of less than about 90%, as measured according to ISO 2469.

"High-purity divalent metal ion carbonate material" in the meaning of the present invention is a divalent metal ion carbonate, such as calcium carbonate or magnesium carbonate, having an ISO brightness R457 of at least about 94%, as measured according to ISO 2469.

"PCC/Waste $CaCO_3$ composite product" in the meaning of the present invention is defined as the precipitated calcium carbonate product that is obtained after the second carbonation step (step (g)) of the inventive process. Both expressions are used synonymously.

"Post-treating" in the meaning of the present invention is defined as a step to produce the desired discrete precipitated divalent metal ion carbonate particles. The post treating is in particular a mechanical deagglomeration of the clusters or of the agglomerates in media mills or alike or is a recrystallization in a heat-ageing step or alike or is high-pressure mechanical dewatering followed by filter cake redispersing.

Figure 5:
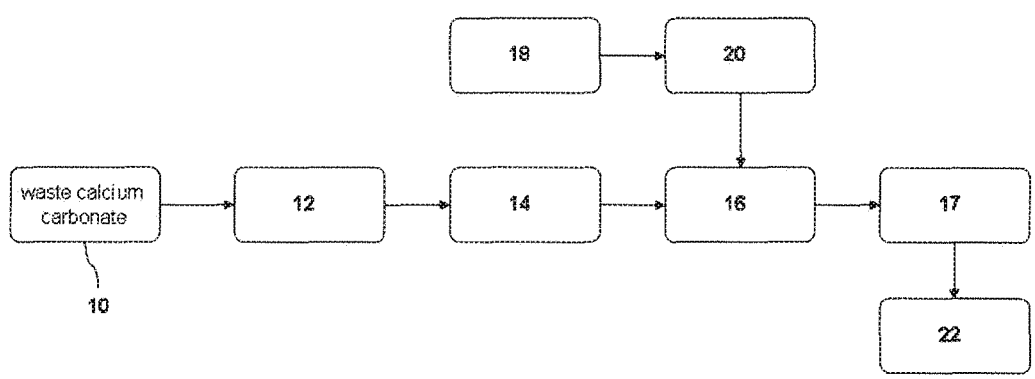
FIG. 5 is a diagram showing the process route of the process according to a prior art process that is known to the applicant.

FIG. 5 illustrates a process flow diagram for producing a calcium carbonate product from a pulp mill waste carbonate according to a prior art process known to the inventors. In a first step the pulp mill waste calcium carbonate 10 is contacted with water to form an aqueous suspension 12 of the calcium carbonate, followed by wet grinding 14 of the calcium carbonate. The so processed "waste calcium carbonate" has a brightness of 67.2%, as measured according to ISO 2469, and a BET specific surface area (SSA) of 14.9 $m^2/g$. In parallel, high-purity burnt lime (CaO) 18 for the production of precipitated calcium carbonate is slaked with water for obtaining a resulting slurry of calcium hydroxide (the so-called "milk of lime") 20. The slurry of calcium hydroxide 20 is then combined 16 with the "waste calcium carbonate" obtained by wet grinding 14, and then the combined mixture 16 of the "waste calcium carbonate" and the calcium hydroxide slurry is subjected to a carbonation step 17 using a carbon dioxide containing compound, such carbon dioxide or a carbon dioxide containing gas. The final product obtained after this carbonation step is a calcium carbonate product 22 containing up to 15% by weight of the "waste calcium carbonate", referred to the dry weight of the final calcium carbonate product. The final calcium carbonate product has a brightness of 83.8%, as measured according to ISO 2469, a BET specific surface area (SSA) of 13.9 $m^2/g$, and a weight median particle diameter $d_{50}$ of 1.7 µm as per Sedigraph 5100.

Figure 6:
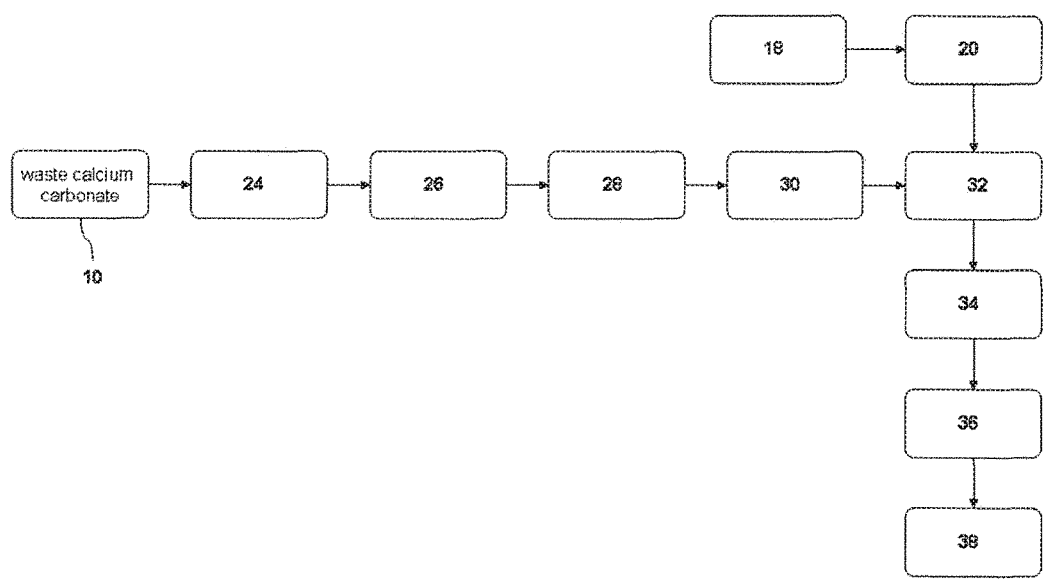
FIG. 6 is a diagram showing the process route of the process according to the present invention.

In contrast thereto, FIG. 6 illustrates a process flow diagram for producing a divalent metal ion carbonate product from a divalent metal ion carbonate which was recovered from waste according to the process of the invention.

First of all there is provided a low-purity divalent metal ion carbonate material 10 (hereinafter referred to as "waste carbonate material" 10) that was recovered from waste. The low-purity divalent metal ion carbonate material 10 is a material having the formula $M^{2+}CO_3^{2-}$ (i.e. $MCO_3$), where $M^{2+}$ is a divalent metal ion selected from the group comprising $Be^{2+}$, $Mg^{2+}$, $Ca^{2+}$, $Sr^{2+}$ and $Ba^{2+}$, and is preferably $Mg^{2+}$ and $Ca^{2+}$, and is most preferably $Ca^{2+}$.

In a first step, the waste carbonate material 10 is subjected to a calcination step 24 in order to obtain the corresponding divalent metal ion oxide. In this regard, the waste carbonate material 10 is introduced into a kiln or a furnace with an optional supply for oxygen-containing gas, and the kiln or furnace is heated to a temperature sufficient for converting the waste carbonate material 10 into the corresponding divalent metal ion oxide. For the calcination of calcium carbonate ($CaCO_3$) typical temperatures are in a range from 900 to 1 300° C., and for magnesium carbonate ($MgCO_3$) typical temperatures are in a range from 800 to 1200° C. The divalent metal ion oxide is a material having the formula $M^{2+}O^{2-}$ (i.e. MO), where $M^{2+}$ is a divalent metal ion selected from the group comprising $Be^{2+}$, $Mg^{2+}$, $Ca^{2+}$, $Sr^{2+}$ and $Ba^{2+}$, and is preferably $Mg^{2+}$ and $Ca^{2+}$, and is most preferably $Ca^{2+}$.

The obtained corresponding divalent metal ion oxide is then subjected to a slaking step 26. In this regard, the divalent metal ion oxide is added to water in a stirred reactor. Before the addition of the divalent metal ion oxide, however, the water temperature is adjusted in a range from 30 to 90° C., preferably 70° C., and additives, such as citric acid sodium salt, can optionally be added. Then, the aqueous suspension of the divalent metal ion oxide is slaked under continuous stirring in order to obtain an aqueous suspension of the corresponding divalent metal ion hydroxide, in the case of the hydroxide being calcium hydroxide, this suspension is the so-called "milk of lime". The divalent metal ion hydroxide is a material having the formula $M^{2+}(OH^-)_2$ (i.e. $M(OH)_2$), where $M^{2+}$ is a divalent metal ion selected from the group comprising $Be^{2+}$, $Mg^{2+}$, $Ca^{2+}$, $Sr^{2+}$ and $Ba^{2+}$, and is preferably $Mg^{2+}$ and $Ca^{2+}$, and is most preferably $Ca^{2+}$. The resulting aqueous suspension of the divalent metal ion hydroxide has preferably a solid content in the range from 5 to 30% by weight, based on the dry weight of the divalent metal ion hydroxide.

The aqueous suspension of the divalent metal ion hydroxide, that optionally can be screened, is then subjected to a carbonation step 28 with a carbon dioxide containing compound. The carbon dioxide containing compound used in the present invention is selected from among gaseous carbon dioxide, liquid carbon dioxide, solid carbon dioxide and a gas containing carbon dioxide, and preferably the carbon dioxide containing compound is a gaseous mixture of carbon dioxide and other gases such as carbon dioxide containing flue gases exhausted from industrial processes like combustion processes or calcination processes or alike. When a gaseous mixture of carbon dioxide and other gases is used, then the carbon dioxide is present in the range of 8 to about 99% by volume, and preferably in the range of 10 to 25% by volume, for example 20% by volume. Before the introduction of the carbon dioxide containing compound, the temperature of the aqueous suspension of the divalent metal ion hydroxide is adjusted in a range of 10 to 70° C., and more preferably in the range of 10 to 30° C., for example 20° C. Furthermore, additives, such as sucrose, sugar alcohols or citric acid can optionally be added to the reaction mixture. Then, the carbon dioxide containing compound is introduced into the aqueous suspension of the divalent metal ion hydroxide at a rate of 0.05 to 2 kg $CO_2$/h per kg of dry $Ca(OH)_2$, and preferably between 0.2 to 0.8 kg $CO_2$/h per kg of dry $Ca(OH)_2$, under simultaneous agitation of the reaction mixture. The end of the carbonation reaction is reached when the electrical conductivity of the reaction mixture has gone through a minimum level and pH of the aqueous suspension of the divalent metal ion hydroxide, that usually is in the range of pH 10 to 13, has dropped to a value of 6 to 8, indicating that substantially all divalent metal ion hydroxide has been converted to the corresponding divalent metal ion carbonate.

The resulting suspension of precipitated divalent metal ion carbonate particles which consist of clusters or agglomerates of fine particles is then further processed or treated in a post-treating step 30 to obtain a suspension of fine discrete precipitated divalent metal ion carbonate particles. Any kind of post-treating for deagglomeration known to the skilled person in the art like, e.g. mechanical deagglomeration in media mills or alike or recrystallization (Ostwald ripening) in a heat-ageing step or alike or high-pressure mechanical dewatering followed by filter cake redispersing, can be applied to produce the desired fine discrete precipitated divalent metal ion carbonate particles.

By discrete particles, the Applicant means particles which are nor clusters nor aggregated particles nor agglomerated particles.

The fine discrete precipitated divalent metal ion carbonate particles have the formula $M^{2+}CO_3^{2-}$ (i.e. $MCO_3$), where $M^{2+}$ is a divalent metal ion selected from the group comprising $Be^{2+}$, $Mg^{2+}$, $Ca^{2+}$, $Sr^{2+}$ and $Ba^{2+}$, and is preferably $Mg^{2+}$ and $Ca^{2+}$, and is most preferably $Ca^{2+}$. In the case when the resulting fine discrete precipitated divalent metal ion carbonate particles are fine discrete precipitated calcium carbonate particles said particles show a brightness of about 70%, as measured according to ISO 2469, and a BET specific surface area (SSA) of about 30 $m^2/g$.

The fine discrete precipitated divalent metal ion carbonate particles in the meaning of the present invention have a particle size of >10 to 500 nm, preferably in the range of 50 to 200 nm, and a specific surface area of 5 to >15 $m^2/g$, preferably in the range of 20 to 50 $m^2/g$.

In a further step, the obtained suspension of fine discrete precipitated divalent metal ion carbonate particles is mixed 32 with an aqueous suspension of divalent metal ion hydroxide that was obtained by slaking 18 high-purity divalent metal ion oxide 16 in order to obtain a resulting reaction mixture. Any high-purity divalent metal ion oxide can be used. Preferably the high-purity divalent metal ion oxide is used in the dry form, for example dry CaO or dry MgO. The solid content of the fine discrete precipitated divalent metal ion carbonate particles in the suspension usually depends on the selected process for post-treating (e.g. by mechanical deagglomeration or recrystallization in a heat-ageing step) the fine precipitated divalent metal ion carbonate obtained after the carbonation step 28, but is normally in a range of 5 to 60% by weight, and preferably in a range of 10 to 40% by weight, based on the total weight of the suspension.

In a next step, the resulting reaction mixture of the aqueous suspension of divalent metal ion hydroxide and the fine precipitated divalent metal ion carbonate is subjected to a further carbonation step 34 with a carbon dioxide containing compound. The carbon dioxide containing compound used in the present invention is selected from among gaseous carbon dioxide, liquid carbon dioxide, solid carbon dioxide and a gas containing carbon dioxide, and preferably the carbon dioxide containing compound is a gaseous mixture of carbon dioxide and other gases such as carbon dioxide containing flue gases exhausted from industrial processes like combustion processes or calcination processes or alike. When a gaseous mixture of carbon dioxide and other gases is used, then the carbon dioxide is present in the range of 8 to about 99% by volume, and preferably in the range of 10 to 25% by volume, for example 20% by volume. Before the introduction of the carbon dioxide containing compound, the temperature of the resulting reaction mixture of the aqueous suspension of divalent metal ion hydroxide and the fine or ultrafine precipitated divalent metal ion carbonate is adjusted in a range of 10 to 70° C., and more preferably in the range of 15 to 60° C., for example 50° C. Furthermore, additives, such as sucrose, sugar alcohols or citric acid can optionally be added to the reaction mixture. Then, the carbon dioxide containing compound is introduced into the resulting reaction mixture of the aqueous suspension of divalent metal ion hydroxide and the fine or ultrafine discrete precipitated divalent metal ion carbonate at a rate of 0.05 to 2 kg $CO_2$/h per kg of dry $Ca(OH)_2$, and preferably between 0.2 to 0.8 kg $CO_2$/h per kg of dry $Ca(OH)_2$, under simultaneous agitation of the reaction mixture. The end of the carbonation reaction is reached when the electrical conductivity of the reaction mixture has gone through a minimum level and pH of the aqueous suspension of the divalent metal ion hydroxide, that usually is in the range of pH 10 to 13, has dropped to a value of 6 to 8, indicating that substantially all divalent metal ion hydroxide has been converted to the corresponding divalent metal ion carbonate 36. The precipitated divalent metal ion carbonate 36 has the formula $M^{2+}CO_3^{2-}$ (i.e. $MCO_3$), where $M^{2+}$ is a divalent metal ion selected from the group comprising $Be^{2+}$, $Mg^{2+}$, $Ca^{2+}$, $Sr^{2+}$ and $Ba^{2+}$, and is preferably $Mg^{2+}$ and $Ca^{2+}$, and is most preferably $Ca^{2+}$.

In an embodiment of the present invention at least part of the precipitated divalent metal ion carbonate product obtained in step (g) can be subjected to at least one further carbonation step, where the at least part of the precipitated divalent metal ion carbonate product obtained in step (g) is first mixed with an aqueous suspension of divalent metal ion hydroxide that was obtained by slaking high-purity divalent metal ion oxide to obtain a resulting reaction mixture and then the resulting reaction mixture is subjected to carbonation. Thus, it is possible to adjust the brightness of the final product depending on the further application of the product. In other words, by subjecting the precipitated divalent metal ion carbonate product obtained in step (g) to at least one further carbonation step, where the at least part of the precipitated divalent metal ion carbonate product obtained in step (g) is first mixed with an aqueous suspension of divalent metal ion hydroxide that was obtained by slaking high-purity divalent metal ion oxide to obtain a resulting reaction mixture and then the resulting reaction mixture is subjected to carbonation it is possible to obtain final products having a higher brightness than the precipitated divalent metal ion carbonate product obtained in step (g).

It is also possible to repeat the carbonation step (d) at least one time before continuing with the post-treating step (e).

In a preferred embodiment according to the invention the precipitated divalent metal ion carbonate particles obtained in step (g) of the inventive process have an ISO brightness R457 in the range of 88 to 94%, as measured according to ISO 2469.

In a further preferred embodiment according to the invention the precipitated divalent metal ion carbonate particles obtained in step (g) have a specific surface area (SSA) in the range of 3 to 30 m²/g, preferably in the range of 5 to 20 m²/g, as measured according to the BET-method using ISO 9277.

Furthermore, it is preferred that the precipitated divalent metal ion carbonate particles obtained in step (g) have a weight median particle diameter $d_{50}$ in the range of 0.5 to 7 µm, preferably in the range of 0.8 to 5 µm, and more preferably in the range of 1 to 3 µm, as measured using a Sedigraph™, sold by the company MICROMERITICS.

In a further embodiment of the present invention the low-purity divalent metal ion carbonate material of step (a) is preferably a calcium carbonate material and the precipitated divalent metal ion carbonate product of step (g) is precipitated calcium carbonate. In this case, the final product obtained is a calcium carbonate product 36 containing up to 50% by weight of the "waste calcium carbonate", based on the dry weight of the final calcium carbonate product. The final calcium carbonate product 36 has an ISO brightness R457 of 90.0%, as measured according to ISO 2469, a BET specific surface area (SSA) of 17.0 m²/g, and a weight median particle diameter $d_{50}$ of about 1.5 µm.

It is noted that the % by weight of the "waste calcium carbonate" that the final product contains, is depending on the desired brightness of the final product and the purity of the "waste calcium carbonate". In the present case where a very low-purity "waste calcium carbonate" was used, only up to 25% by weight of said "waste calcium carbonate" can be contained in the calcium carbonate product 36 for a specified minimum brightness of 90% R457, as per ISO 2469.

Without wishing to be bound by any theory, it is believed that in this further carbonation step 34 the fine discrete precipitated divalent metal ion carbonate particles are acting as seed material for the precipitation of the precipitated divalent metal ion carbonate product 36 that is formed by the reaction of the carbon dioxide containing compound and the high-purity divalent hydroxide in this further carbonation step. The precipitated divalent metal ion carbonate derived from the high-purity divalent metal ion hydroxide is growing as a "shell" around the precipitated divalent metal ion carbonate particles ("core") that have a low purity and low brightness. In this way, the present inventors obtained a precipitated divalent metal ion carbonate product having an improved brightness as compared to the precipitated divalent metal ion carbonate particles obtained in the first carbonation step 28 and as compared to precipitated calcium carbonate products that are obtained from calcium compound containing waste materials in prior art processes.

If required, the aqueous suspension comprising the precipitated divalent metal ion carbonate product of step (g) (or comprising the precipitated divalent metal ion carbonate product of at least one further carbonation step following step (g)) can be submitted to further post treatment steps 38 comprising, among others, separating, filtering, concentrating and drying in order to obtain dried precipitated calcium carbonate. It is noted that in particular the concentration step is a very useful one because in this way one can obtain an aqueous suspension with a solid content of the final precipitated divalent metal ion carbonate product in a range of 40 to 80% by weight, based on the total weight of the aqueous suspension, which is preferably used in further applications such as paper- or board coating applications.

The present invention is also directed to an aqueous suspension comprising the precipitated divalent metal ion carbonate obtained by the process according to the invention, as well as to the dried precipitated divalent metal ion carbonate obtained by the process according to the invention. In the present invention the term "dry" preferably refers to a final precipitated divalent metal ion carbonate product having a water content of less than 10% by weight, more preferably less than 5% by weight, and even more preferably less than 2% by weight.

Moreover, the present invention is directed to the use of the aqueous suspension or the dried precipitated divalent metal ion carbonate according to the invention in coating formulations or as fillers in the paper nuking-, plastic- and paint industries.

In addition, the present invention is also directed to the use of the dried precipitated divalent metal ion carbonate according to the invention in the field of paints, rubber, plastics, building materials, and inks.

EXAMPLES

The following examples are intended to illustrate certain embodiments of the invention and are understood to be non-limiting to the invention in any way.

For the purpose of the present invention, the value of the parameter $d_{50}$(%) is obtained by particle size measurements for which respectively 50% by mass of the particles have a diameter of less than or equal to this value.

The term w/w refers to the mass fraction of a material and is defined as the fraction of the material with mass $m_{mat}$ to the mass of the total mixture $m_{tot}$.

Measurement Methods:
Suspension pH Measurement

The pH of a suspension was measured at 25° C. using a Mettler Toledo Seven Easy pH meter and a Mettler Toledo InLab® Expert Pro pH electrode.

A three point calibration (according to the segment method) of the instrument was first made using commercially available buffer solutions (from Aldrich) having pH values of 4, 7 and 10 at 20° C.

The reported pH values are the endpoint values detected by the instrument (the endpoint being the point when the measured signal differs by less than 0.1 mV from the average over the last (prior) 6 seconds).

BET Specific Surface Area

The BET specific surface area (also designated as SSA) was determined according to ISO 9277 using a Tristar II 3020 sold by the company MICROMERITICS™.

Particle Size Distribution (Mass % Particles with a Diameter<X μm) and Weight Median Particle Diameter ($d_{50}$) of Particulate Material ($d_{50}$ (μm))
Sedigraph™ 5100

The weight median particle diameter and the particle diameter mass distribution of a particulate material were determined via the sedimentation method, i.e. an analysis of sedimentation behavior in a gravimetric field. The measurement is made with a Sedigraph™ 5100 sold by the company MICROMERITICS™.

The method and the instrument are known to the skilled person and are commonly used to determine particle size of fillers and pigments. Samples were prepared by adding an amount of the product corresponding to 4 g dry PCC to 60 ml of an aqueous solution of 0.1% by weight of $Na_4P_2O_7$. The samples were dispersed for 3 minutes using a high speed stirrer (Polytron PT 3000/3100 at 15 000 rpm). Then it was submitted to ultrasound using an ultrasonic bath for 15 minutes and thereafter added to the mixing chamber of the Sedigraph.

Viscosity Measurement

The Brookfield viscosity was measured after 1 minute of stirring by the use of a RVT model Brookfield™ viscometer at a temperature of 20° C. and a rotation speed of 100 rpm (revolutions per minute) with the appropriate disc spindle 2, 3 or 4.

Weight Solids (% by Weight) of a Material in Suspension

The weight solids (also called solids content of a material) was determined by dividing the weight of the solid material by the total weight of the aqueous suspension.

The weight of the solid material was determined by weighing the solid material obtained by evaporating the aqueous phase of the suspension and drying the obtained material to a constant weight.

Brightness Measurement and Yellowness Index

The pigment brightness and yellowness index of the obtained particles were measured using an ELREPHO 450× from the company Datacolor according to ISO 2469 and DIN 6167, respectively.

The samples were dried in an oven at 105° C. to a residual moisture content of <0.5% by weight and the resulting powder was treated to deagglomerate the powder particles. From 12 g of said powder a tablet was pressed via application of 4 bar pressure for 15 s. The resulting powder tablet with a diameter of 45 mm was then subjected to the measurement.

In the present measurement the yellowness index was measured via measuring the reflectance of the obtained precipitated calcium carbonate product, the illuminant used being D 65 and the standard observer function being 10°.

The Yellowness Index according to DIN 6167 is calculated as follows:

$$YI(DIN\ 6167) = \frac{a \times X - b \times Z}{Y} \times 100$$

where X, Y, and Z are the CIE Tristimulus values and the coefficients depend on the illuminant and the observer function as indicated in the Table below:

| Illuminant | D65 |
|---|---|
| Observer | 10° |
| a | 1.301 |
| b | 1.149 |

PPS Roughness Measurement

The Parker Print-Surf roughness was determined according to ISO 8791-4: 2007 and is specified in μm. The pps-roughness is obtained by measuring the air flow on the surface of a paper sheet, i.e. in the xy-plane. The measurement is done with a defined measuring device, with defined pressure of the measuring facility to the paper surface and with a defined rubber plate on the contrary paper side, the resulting values are calculated from pressure differences and describe the width of the slit which enables the air to pass between the measuring facility and the paper surface.

A. Production of Precipitated Calcium Carbonate from Pulp Mill Waste

Example 1—Comparative Example

This example describes a process of the prior art for the production of a calcium carbonate product starting from calcium carbonate obtained from pulp mill waste, where the calcium carbonate obtained from pulp mill waste is wet-ground and then used in a carbonation reaction together with an aqueous slurry of high-purity calcium hydroxide.

Low-purity waste $CaCO_3$ discharged from a kraft pulp mill's chemicals recovery process was obtained from Klabin Papeís S. A., Telemaco Borba mill (Brazil). 845 kg of said waste $CaCO_3$ that contained 75.9% w/w dry matter were added to 300 liters of 20° C. tap water provided in a 700 liter agitated make-down vessel, equipped with a dissolver plate. Prior to the addition of waste $CaCO_3$, 20.7 kg of an appropriate dispersing agent well known to the person skilled in the art were added to the water as dispersing aid. The waste $CaCO_3$ was converted (made-down) into an aqueous slurry of the waste $CaCO_3$ by the introduction of the moist cake under vigorous agitation. The aqueous slurry of the waste $CaCO_3$ had a solid content of 56.2% by weight.

The obtained slurry of the waste $CaCO_3$ was then wet-ground in two passes on a 50 liter vertical bead mill filled with 96 kg ceria-comprising zirconium oxide grinding beads of 1.0 mm diameter (pass 1) and 0.45 mm diameter (pass 2), respectively. To obtain a final target fineness of about 83% of particles having a weight median particle size of <1 μm (as measured using a Sedigraph 5100), a total specific grinding energy of 156 kWh/DMT (DMT=Dry metric ton) was required. Prior to wet-grinding, another 12.4 kg of an appropriate dispersing agent well known to the person skilled in the art were added to the mill feed.

200 kg of PCC grade high-purity quicklime CaO (Kalkwerk LEUBE, (lolling/Austria) were added to 1.700 liters of 50° C. tap water in a stirred slaking reactor. Before slaking 0.66 kg of a 30% w/w aqueous solution of sodium citrate was added to the slaking water. The quicklime was slaked for 30 minutes under continuous stirring and the resulting slurry of calcium hydroxide ("milk of lime") was adjusted to a solids content of 13.7% via dilution of the milk of lime with 60° C. water and was then screened on a 200 μm screen to remove grits.

The carbonation was conducted in a 2 000 liter baffled cylindrical stainless steel reactor equipped with a gasing agitator, a stainless steel carbonation tube to direct a carbon dioxide/air gas stream to the impeller and probes for monitoring the pH and conductivity of the suspension. 71 liters of said wet-ground waste $CaCO_3$ slurry containing 55.9% w/w dry matter of waste $CaCO_3$ were added to the carbonator and mixed with 1 679 liters of the 13.7% w/w aqueous suspension of calcium hydroxide obtained in the slaking step as described above. The temperature of the reaction mixture was adjusted to 50° C. A gas of 20% by volume of $CO_2$ in air was then bubbled upwards through the reaction mixture at a standard volumetric flow of 200 m³/h (standard volume flow as defined in DIN 1343, at a temperature of 0° C. (273.15 K), 101.325 kPa, and relative humidity of 0%) under vigorous agitation. During the carbonation, the temperature of the reaction mixture was not controlled and allowed to rise due to the heat generated in the exothermic precipitation reaction. The carbonation was maintained until the electrical conductivity suddenly dropped and passed through a minimum indicating that the carbonation was substantially complete. The introduction of the $CO_2$-containing gas was continued for another 10 minutes before the introduction of the gas was stopped. Carbonation time, calculated from the start of the gas introduction to the time of conductivity minimum, was 97 minutes. The reaction mixture was then screened on a 45 μm screen and the screened product was recovered as an aqueous slurry of $CaCO_3$. Based on the total $CaCO_3$ dry matter in the obtained PCC/Waste $CaCO_3$ composite product, the share of low-purity pulp mill waste $CaCO_3$ was 15.6% w/w. The ISO brightness R457 of the obtained PCC/Waste $CaCO_3$ composite product was 83.8%.

The physical properties of the product obtained in the process described in Example 1 are given in Table 1 below.

Example 2—Inventive Example

This example refers to the inventive process for the production of a calcium carbonate product starting from calcium carbonate obtained from pulp mill waste, where the calcium carbonate obtained from pulp mill waste is calcined to Obtain a pulp mill waste lime (CaO), slaked and the resulting milk of lime is subsequently carbonated and processed to obtain a particular pulp mill waste precipitated calcium carbonate (PCC) featuring ultrafine discrete particles. The resulting material is then subjected to a carbonation reaction together with an aqueous slurry of high-purity calcium hydroxide (so called "milk of lime").

Low-purity waste $CaCO_3$ from Example 1, which is typically discharged from the kraft pulp mill's chemicals recovery process of Klabin Papeís S. A., Telemaco Borba Mill, was calcined at a temperature in a range of 900 to 1 300° C. in a rotary kiln and pre-crushed on a hammer mill to obtain a low-purity pulp mill waste CaO. 200 kg of this waste CaO (quicklime) were added to 1 800 liters of 70° C. tap water in a stirred slaking reactor. The quicklime was slaked for 30 minutes under continuous stirring and the resulting slurry was recovered as an aqueous suspension of calcium hydroxide ("milk of waste lime"). 1 800 liters of said milk of waste lime were added to the carbonator and the temperature of the milk of waste lime was adjusted to 20° C. Prior to carbonation 1.3 liters of a 70% w/w aqueous solution of a sugar alcohol (Sorbitol 80%, Brenntag CEE GmbH) were added.

The carbonation was conducted in the same way as described in example 1. Carbonation time, calculated from the start of the gas introduction to the time of the conductivity minimum, was 54 minutes. The reaction mixture was then screened on a 45 μm screen and mechanically dewatered on a decanter centrifuge (KHD Humboldt Wedag AG, Type SC 01). The filter cake discharged from the centrifuge was then redispersed with water and converted (made-down) into an aqueous slurry containing 30.4% w/w dry matter of "Pulp Mill Waste PCC". During the slurry make-down, an adequate quantity of an appropriate dispersing agent well known to the person skilled in the art was added. This "Pulp Mill Waste PCC" slurry containing 30.4% w/w solids was then passed through a vertical media mill equipped with 0.4-0.7 mm ceria-comprising zirconium oxide grinding beads for deagglomeration. The specific energy input during processing in the media mill was 74 kWh/DMT $CaCO_3$ (DMT=Dry metric ton). The aqueous slurry discharged from the media mill containing 29.7% w/w dry matter of $CaCO_3$ was recovered as an aqueous slurry of "Processed Pulp Mill Waste PCC" to be used as seeding material for the carbonation described below. The structure of the material determined in SEM micrograph was discrete ultrafine precipitated calcium carbonate (PCC) particles with primary particle sizes (determined from SEM) of about 50 to 200 nm.

200 kg of PCC grade high-purity quicklime CaO (Kalkwerk LEUBE, Golling/Austria) were added to 1 700 liters of 50° C. tap water in a stirred slaking reactor. Before slaking 0.66 kg of a 30% w/w aqueous solution of sodium citrate was added to the slaking water. The quicklime was slaked for 30 minutes under continuous stirring and the resulting slurry of calcium hydroxide ("milk of lime") adjusted to 13.3% solids content via dilution of the milk of lime with 60° C. water and was then screened on a 200 μm screen to remove grits.

The carbonation was conducted in a 2 000 liter baffled cylindrical stainless steel reactor equipped with a gasing agitator, a stainless steel carbonation tube to direct a carbon dioxide/air gas stream to the impeller and probes for monitoring the pH and conductivity of the suspension. 250 liters of the "Processed Pulp Mill Waste PCC" slurry containing 29.7% w/w solids and obtained in the process described above were added to the carbonator and mixed with 1 550 liters of the 13.3% w/w aqueous suspension of calcium hydroxide obtained in the slaking step as described above. The temperature of the reaction mixture was adjusted to 50° C. A gas of 20% by volume of $CO_2$ in air was then bubbled upwards through the reaction mixture at a standard volumetric flow of 200 $m^3$/h (standard volume flow as defined in DIN 1343, at a temperature of 0° C. (273.15 K), 101.325 kPa, and relative humidity of 0%) under vigorous agitation. During the carbonation, the temperature of the reaction mixture was not controlled and allowed to rise due to the heat generated in the exothermic precipitation reaction. The carbonation was maintained until the electrical conductivity suddenly dropped and passed through a minimum indicating that the carbonation was substantially complete. The introduction of the $CO_2$-containing gas was continued for another 10 minutes before the introduction of the gas was stopped. Carbonation time, calculated from the start of the gas introduction to time of the conductivity minimum, was 86 min. The reaction mixture was then screened on a 45 μm screen and the screened product was recovered as an aqueous slurry of $CaCO_3$. Based on the total $CaCO_3$ dry matter in the obtained PCC/Waste $CaCO_3$ composite product, the share of original low-purity pulp mill waste $CaCO_3$ was 23.5% w/w. The ISO brightness R457 of the obtained PCC/Waste $CaCO_3$ composite product was 90.0%.

The physical properties of the product obtained by the process according to the invention as described above are listed in Table 1.

Example 3—Comparative Example

This example refers to a prior art process for the production of a calcium carbonate product starting from calcium carbonate obtained from pulp mill waste, where the calcium carbonate obtained from pulp mill waste is calcined to obtain a pulp mill waste lime (CaO). The pulp mill waste lime is then mixed with PCC grade high-purity quicklime, slaked and the resulting milk of lime mixture is then used in a carbonation reaction.

Low-purity waste $CaCO_3$ from Example 1, which is typically discharged from the kraft pulp mill's chemicals recovery process of Klabin Papeís S. A., Telemaco Borba Mill, was calcined in a rotary kiln at a temperature in the range of 900 to 1 300° C. and pre-crushed on a hammer mill to obtain a low-purity pulp mill waste CaO. 30 kg of this waste CaO were mixed with 170 kg of a PCC grade high-purity quicklime CaO (Lhoist Belocal, Arcos MG/Brazil) and this lime mixture was added to 1 700 liters of 60° C. tap water in a stirred slaking reactor. Before slaking 0.80 kg of a 30% w/w aqueous solution of sodium citrate were added to the slaking water. The quicklime was slaked for 30 minutes under continuous stirring and the resulting slurry of calcium hydroxide ("milk of lime") was adjusted to a solids content of 13.6% via dilution of the milk of lime with 60° C. water and was then screened on a 200 μm screen to remove grits. 1 800 liters of said milk of lime were added to the carbonator and temperature of the milk of lime was adjusted to 50° C.

The carbonation was conducted in a 2 000 liter baffled cylindrical stainless steel reactor equipped with a gasing agitator, a stainless steel carbonation tube to direct a carbon dioxide/air gas stream to the impeller and probes for monitoring the pH and conductivity of the suspension. A gas of 20% by volume of $CO_2$ in air was then bubbled upwards through the reaction mixture at a standard volumetric flow of 200 $m^3$/h (standard volume flow as defined in DIN 1343, at a temperature of 0° C. (273.15 K), 101.325 kPa, and relative humidity of 0%) under vigorous agitation. During the carbonation, the temperature of the reaction mixture was not controlled and allowed to rise due to the heat generated in the exothermic precipitation reaction. The carbonation was maintained until the electrical conductivity suddenly dropped and passed through a minimum indicating that the carbonation was substantially complete. The introduction of the $CO_2$-containing gas was continued for another 10 minutes before the introduction of the gas was stopped. Carbonation time, calculated from the start of the gas introduction to time of the conductivity minimum, was 84 min. The reaction mixture was then screened on a 45 μm screen and the screened product was recovered as an aqueous slurry of $CaCO_3$. Based on the total $CaCO_3$ dry matter in the obtained PCC composite product, the share of original low-purity pulp mill waste $CaCO_3$ was 15.0% w/w. The ISO brightness R457 of the obtained PCC composite product was 90.6%.

The physical properties of the product obtained by the process described in Example 3 are listed in Table 1.

B. Use of the Obtained Precipitated Calcium Carbonate in Coating Trials

The Mowing examples demonstrate the use of the precipitated divalent metal ion carbonate product obtained according to the inventive process as a pigment in pre-coating fotinulations.

First of all, the aqueous suspension of precipitated divalent metal ion carbonate product having a solid content in the range of 10 to 30% by weight, based on the total weight of the aqueous suspension, is concentrated in order to have a final solid content in the range of 40 to 80% by weight, preferably in the range of 50 to 75% by weight, and more preferably in the range of 60 to 75% by weight. The concentration can be achieved by any method known to the skilled person, such as thermal concentration, partial dewatering, and the like. However, an alternative way to obtain the suspension precipitated divalent metal ion carbonate product having a solid content in the range of 40 to 80% by weight, based on the total weight of the aqueous suspension, is to dewater the aqueous suspension precipitated divalent metal ion carbonate product having a solid content in the range of 10 to 30% by weight, by use of a filter press or similar means, and to re-disperse the obtained dewatered residue of precipitated divalent metal ion carbonate product in an amount of liquid sufficient to produce an aqueous suspension of the precipitated divalent metal ion carbonate product having a solid content in the range of 40 to 80% by weight.

This is described in detail below in Examples 4 and 5 for the products obtained in Examples 2 and 3, respectively.

Example 4—Comparative Example

The PCC/Waste $CaCO_3$ composite product obtained in the prior art process described in Example 3 was mechanically dewatered on a filter press and the discharged filter cake was redispersed, in the presence of an adequate quantity of an appropriate dispersing agent well known to the person skilled in the art, in a high-shear mixer to obtain a high-solids slurry that can be used as a coating pigment. The product after the conversion (make-down) was recovered as an aqueous slurry containing 72.8% dry matter of the PCC/Waste $CaCO_3$ composite product (i.e. a high solids slurry).

The physical properties of the product obtained in the process described in Example 4 are listed in Table 1.

Example 5—Inventive Example

The PCC/Waste $CaCO_3$ composite product obtained in the inventive process described in Example 2 was mechanically dewatered on a filter press and the discharged filter cake was redispersed in a high-shear mixer to obtain a high-solids slurry that can be used as a coating pigment. During the conversion of the filter cake into the slurry (slurry make-down), an adequate quantity of an appropriate dispersing agent well known to the person skilled in the art was added. The product after the conversion (make-down) was recovered as an aqueous slurry containing 66.8% dry matter of the PCC/Waste $CaCO_3$ composite product.

Figure 4:
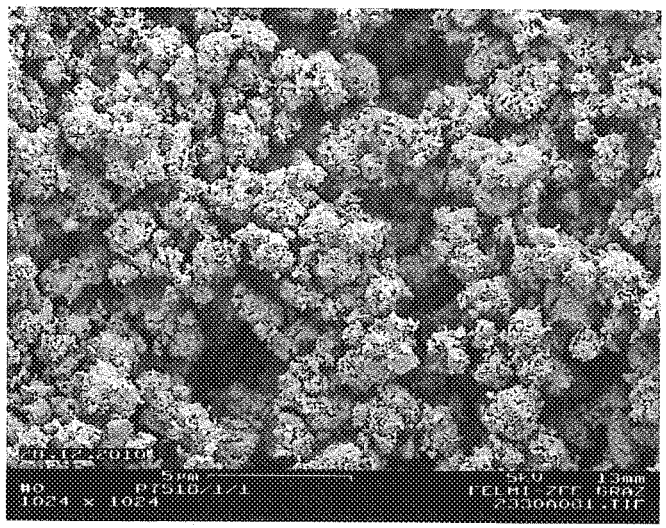
FIG. 4 is a SEM photomicrograph of a scalenohedral-shaped PCC used for coating, being made according to this invention by the process described in Example 5.

The physical properties of the product obtained in the process described in Example 5 are listed in Table 1 and the SEM micrograph is disclosed in FIG. 4.

In pilot coating trials, the PCC/Waste $CaCO_3$ composite coating pigments obtained in Examples 4 (prior art) and 5 (invention) were evaluated in Liquid Packaging Board (LPB) pre-coating formulations and compared to state-of-the-art coating pigments typically used for that application.

Using the products obtained in Example 4 (prior art) and Example 5 (invention), described above, first and second pre-coating formulations were prepared (trials M8 and M9). Moreover, a first and a second pre-coating formulation not containing any waste PCC were also prepared for comparison reasons (Trial No. 1).

In trials No. 2 (invention) and No. 3 (prior art), every first pre-coating formulation also contained a latex, a synthetic thickener, and a crosslinker in addition to the specific waste PCC. The second pre-coating formulation also contained a latex, carboxymethyl cellulose (CMC), a crosslinker, and calcium stearate (Ca-stearate) in addition to the specific waste PCC.

The compositions of the first and second pre-coating formulations are listed in Table 2.

Coating Concept

The pilot coater trials have been conducted at 400 m/min with the purpose to assess the impact of the different coating formulations on the properties of a double pre-coated packaging board.

A metered size press was used to coat a packaging base board having a grammage of 298 $g/m^2$, a brightness of 76.5%, and a PPS roughness of 5.8 µm with a first pre-coat having a coating weight of 4 $g/m^2$. The rod used was grooved and had a diameter of 12 mm.

In a next step, the second pre-coating was applied on the first pre-coating using a jet application with a 0.38 mm thick bent blade. The applied coating weight was 10 $g/m^2$.

By using a bent blade as well as metered size press one achieves a good coverage and a smooth surface for good printability. The bent blade operates as a lubricational metering unit and also promotes contour coating by compressing the surface below the coating being applied to achieve a smooth surface whereas the metered size press applies a typical contour coating for enhanced coverage.

The formulations, methods and conditions used, as well as results, are listed in Table 2.

From Table 1 it is clear that the precipitated calcium carbonate product obtained by the process according to the present invention shows a comparable brightness (compared to Example 1) or even a better brightness (compared to Example 3) than a precipitated calcium carbonate obtained by prior art processes.

TABLE 1

Physical properties of the precipitated calcium carbonates obtained according to the prior art method and according to the present invention

| Product name for pilot coater trials | | 1 Prior Art | 2 Invention | 3 Prior Art | 4 Prior Art PCC Exp. 3 | 5 Invention PCC Exp. 2 |
|---|---|---|---|---|---|---|
| Share of Pulp Mill Waste $CaCO_3$ | [% dry/dry] | 15.0 | 23.5 | 15.0 | 15.0 | 23.5 |
| Specific Surface area BET | [$m^2/g$] | 13.9 | 17.0 | 3.9 | 5.7 | 18.7 |
| PSD Sedigraph 5100 | | | | | | |
| <5 µm | [%] | 99 | 98 | 39 | 96 | 97 |
| <2 µm | [%] | 73 | 81 | 11 | 82 | 89 |
| <1 µm | [%] | 9 | 9 | 3 | 54 | 41 |
| <0.5 µm | [%] | 2 | 3 | | 14 | 20 |
| <0.2 µm | [%] | | 3 | | 3 | 13 |
| $d_{50}$ | [µm] | 1.67 | 1.54 | 6.48 | 0.94 | 1.12 |
| Brightness (DIN 53140) | | | | | | |
| R457 (ISO 2469) | [%] | 83.8 | 90.0 | 90.6 | 91.5 | 89.7 |
| Yellow Index (DIN 6167) | [—] | 0.3 | 4.0 | 4.4 | 3.5 | 3.7 |
| Solids content | [%] | 18.7 | 18.4 | 15.5 | 72.8 | 66.8 |
| Viscosity (Brookfield 100 rpm) | [mPas] | 30 | 30 | 20 | 180 | 560 |
| pH slurry | [—] | 7.6 | 7.4 | 7.1 | 9.3 | 9.6 |

TABLE 2

Data and results of pilot coating trials comprising formulations containing calcium carbonate products obtained according to the prior art methods (M1, M9) and according to the present invention (M8)

| | | | Trial No. | | |
|---|---|---|---|---|---|
| | | | 1 Prior Art | 2 Invention | 3 Prior Art |
| Base board | Grammage | [g/m²] | | 298 | |
| | Brightness R457 + UV | [%] | | 76.5 | |
| | PPS Roughness | [μm] | | 5.8 | |
| 1st Precoat | Coat weight | [g/m²] | | 4 | |
| | Application | | | Metering Sizepress (MSP) | |
| | Rod diameter/type | | | 12 mm/grooved | |
| | Machine speed | [m/min] | | 400 | |
| Formulation | Hydrocarb 60 - ME 78%[1] | [parts] | 100 | 30 | 30 |
| | PCC Exp. 2 | [parts] | — | 70 | — |
| | PCC Exp. 3 | [parts] | — | — | 70 |
| | Latex[3] | [pph][2] | 13 | 13 | 13 |
| | Synthetic thickener[4] | [pph][2] | 0.5 | 0.5 | 0.5 |
| | Crosslinker[5] | [pph][2] | 0.7 | 0.7 | 0.7 |
| | Coating solids[6] | [%] | 60.5 | 60.6 | 60.4 |
| 2nd Precoat | Coat weight | [g/m²] | | 10 | |
| | Application | | | Jet Application | |
| | Blade operation/-thickness | | | Bent Blade/0.38 mm | |
| | Machine speed | [m/min] | | 400 | |
| Formulation | Hydrocarb 90 - ME 78%[7] | [parts] | 70 | 21 | 21 |
| | Century Clay[8] | [parts] | 30 | 30 | 30 |
| | PCC Exp. 2 | [parts] | — | 49 | — |
| | PCC Exp. 3 | [parts] | — | — | 49 |
| | Latex[3] | [pph][2] | 15 | 15 | 15 |
| | Carboxy methyl cellulose[9] | [pph][2] | 0.97 | 0.97 | 0.97 |
| | Crosslinker[5] | [pph][2] | 1.1 | 1.1 | 1.1 |
| | Ca-Stearate[10] | [pph][2] | 1.1 | 1.1 | 1.1 |
| | Coating solids[6] | [%] | 62.8 | 62.7 | 62.7 |
| Precoated board | Grammage | [g/m²] | 313 | 311 | 311 |
| | Brightness R457 + UV | [%] | 81.6 | 81.7 | 81.5 |
| | PPS Roughness | [μm] | 3.08 | 2.59 | 2.63 |

[1]Natural calcium carbonate coating pigment, available from Omya AG, Oftringen, Switzerland
[2]Quantity in parts per hundred per dry mass; refers to the total amount of of dry matter pigment(s) in the formulation which is defined to be 100 parts.
[3]Styronal 517, latex binder, available from BASF AG, Ludwigshafen, Germany
[4]Sterocoll FS, synthetic thickener, available from BASF AG, Ludwigshafen, Germany
[5]Cartabond MZI, crosslinker, available from Clariant AG, Muttenz, Switzerland
[6]Content of dry matter contained in the coating formulation, based on the total dry weight of the coating formulation.
[7]Wet-gound natural calcium carbonate coating pigment, available from Omya AG, Oftringen, Switzerland
[8]Brazilian kaolin coating pigment, available from Imerys S.A.
[9]Finnfix 30, carboxy methyl cellulose thickener, available from CP Kelco, Äänekoski, Finland
[10]Calsan 50, calcium stearate dispersion, available from BASF AG, Ludwigshafen, Germany As can be seen in trials No. 2 (invention) and No. 3 (prior art), the inventive product obtained in Example 5 achieved a similar brightness and PPS roughness of the board after a second pre-coat compared to the prior art product obtained in Example 4, despite a much higher share of low-purity Pulp Mill Waste $CaCO_3$, namely 23.5% vs. 15%.

Compared to liquid packaging board (LPB) pre-coating formulations containing state-of-the-art "virgin" GCC (Ground Calcium Carbonate) pigments that do not contain any low-purity waste material, the brightness was maintained at a similar level and the PPS roughness was even improved (see control trial No. 1 compared to trial No. 2 according to the invention).

In summary, the inventors of the present invention were able to produce a precipitated divalent metal ion carbonate product from a divalent metal ion carbonate that was recovered from waste material, the precipitated divalent metal ion carbonate product having a comparable or even an improved brightness, compared to precipitated divalent metal ion carbonate product obtained by prior art processes.

In addition, the inventors were able to show that the inventive precipitated divalent metal ion carbonate products, and in particularly a precipitated calcium carbonate product, can be used as coating pigments in pre-coating formulations for packaging boards, the boards having similar brightness and PPS roughness compared to a board that was treated with a pre-coating formulation containing a precipitated divalent metal ion carbonate products that was obtained by a prior art process and that contained a lower share of low-purity Pulp Mill Waste $CaCO_3$.

Compared to LPB pre-coating formulations containing state-of-the-art "virgin" GCC (Ground Calcium Carbonate) pigments that do not contain any low-purity waste material, the brightness was maintained at a similar level and the PPS roughness was even improved.

Last but not least, the present invention contributes to the protection of the environment since it prevents a cost inefficient storage and disposal of the divalent metal ion carbonate residues of the papermaking and cellulose industries. Moreover, the present invention also has the advantage that it reduces the costs of those industries since the cost inefficient storage and disposal of said divalent metal ion carbonate residues are no longer necessary.

It is noted that the foregoing description and examples have been set forth merely to illustrate the invention and are not intended to be limiting. Since modifications of the described embodiments incorporating the spirit and substance of the invention may occur to persons skilled in the art, the invention should be construed broadly to include all variants falling within the scope of the following claims and equivalents thereof.

The invention claimed is:

1. An aqueous suspension comprising a product obtained by the process comprising the steps of:
   (a) providing a low-purity divalent metal ion carbonate material;
   (b) calcining the divalent metal ion carbonate material of step (a) to obtain a divalent metal ion oxide;
   (c) slaking the divalent metal ion oxide obtained in step (b) to obtain an aqueous suspension of a divalent metal ion hydroxide;
   (d) carbonating the aqueous suspension of the divalent metal ion hydroxide obtained in step (c) with a carbon dioxide containing compound to obtain fine precipitated divalent metal ion carbonate particles;
   (e) subjecting the fine precipitated divalent metal ion carbonate particles obtained in step (d) to deagglomeration to obtain fine discrete precipitated divalent metal ion carbonate particles;
   (f) mixing the fine discrete precipitated divalent metal ion carbonate particles obtained in step (e) with an aqueous suspension of high-purity divalent metal ion hydroxide to obtain a resulting reaction mixture; and
   (g) carbonating the resulting reaction mixture of step (f) to obtain a product consisting of precipitated high purity divalent metal ion carbonate that forms shells around the discrete precipitated divalent metal ion carbonate particles, wherein the product has a higher brightness and purity than the precipitated divalent metal ion carbonate particles obtained in step (d).

2. The aqueous suspension according to claim 1, wherein at least part of the product obtained in step (g) is subjected to at least one further carbonation step, where the at least part of the product obtained in step (g) is first mixed with an aqueous suspension of high-purity divalent metal ion hydroxide to obtain a resulting reaction mixture and then the resulting reaction mixture is subjected to carbonation.

3. The aqueous suspension according to claim 1, wherein the low-purity divalent metal ion carbonate material of step (a) is a material having the formula $M^{2+}CO_3^{2-}$, where $M^{2+}$ is a divalent metal ion selected from the group consisting of $Be^{2+}$, $Mg^{2+}$, $Ca^{2+}$, $Sr^{2+}$ and $Ba^{2+}$.

4. The aqueous suspension according to claim 1, wherein the low-purity divalent metal ion carbonate material of step (a) is a material having the formula $M^{2+}CO_3^{2-}$, where $M^{2+}$ is a divalent metal ion selected from the group consisting of $Mg^{2+}$ and $Ca^{2+}$.

5. The aqueous suspension according to claim 1, wherein the low-purity divalent metal ion carbonate material of step (a) is a material having the formula $M^{2+}CO_3^{2-}$, where $M^{2+}$ is $Ca^{2+}$.

6. The aqueous suspension according to claim 1, wherein the deaggolmeration of step (e) is carried out by mechanical deagglomeration or by recrystallization of the fine precipitated divalent metal ion carbonate particles obtained in step (d).

7. The aqueous suspension according to claim 1, wherein the fine discrete precipitated divalent metal ion carbonate particles obtained in step (e) have a particle size of 10 to 500 nm, and a specific surface area of 5 to 15 $m^2/g$.

8. The aqueous suspension according to claim 1, wherein the fine discrete precipitated divalent metal ion carbonate particles obtained in step (e) have a particle size of 50 to 200 nm, and a specific surface area of 20 to 50 $m^2/g$.

9. The aqueous suspension according to claim 1, wherein the product obtained in step (g) has an ISO brightness R457 in the range of 88 to 94%, as measured according to ISO 2469.

10. The aqueous suspension according to claim 1, wherein the product obtained in step (g) has a specific surface area in the range of 3 to 30 $m^2/g$, as measured according to the BET-method using ISO 9277.

11. The aqueous suspension according to claim 1, wherein the product obtained in step (g) has a specific surface area in the range of 5 to 20 $m^2/g$, as measured according to the BET-method using ISO 9277.

12. The aqueous suspension according to claim 1, wherein the product obtained in step (g) consists of particles having a weight median particle diameter $d_{50}$ in the range of 0.5 to 7 μm.

13. The aqueous suspension according to claim 1, wherein the product obtained in step (g) consists of particles having a weight median particle diameter $d_{50}$ in the range of 0.8 to 5 μm.

14. The aqueous suspension according to claim 1, wherein the product obtained in step (g) consists of particles having a weight median particle diameter $d_{50}$ in the range of 1 to 3 μm.

15. The aqueous suspension according to claim 1, wherein the low-purity divalent metal ion carbonate material of step (a) is a calcium carbonate material and the precipitated high purity divalent metal ion carbonate of step (g) is precipitated calcium carbonate.

16. The aqueous suspension according to claim 15, wherein the precipitated carbonate is scalenohedral precipitated calcium carbonate.

17. The aqueous suspension according to claim 1, wherein the product of step (g) is concentrated to form an aqueous slurry with a solids content of about 50% or higher.

18. The aqueous suspension according to claim 1, wherein the low-purity divalent metal ion carbonate material of step (a) is from pulp mill waste.

19. The aqueous suspension according to claim 1, wherein the high-purify divalent metal ion hydroxide of step (f) is prepared by slaking high-purity divalent metal ion oxide.

20. Dried product obtained by drying the aqueous suspension of claim 1.

21. Paper, plastic or paint manufactured with or comprising the aqueous suspension according claim 1 or a dried product thereof.

22. Paint, rubber, plastic, building material or ink comprising the dried precipitated divalent metal ion carbonate according to claim 20.

* * * * *